(12) United States Patent
Ghanwani et al.

(10) Patent No.: US 12,706,863 B2
(45) Date of Patent: Aug. 11, 2026

(54) PACKET FORWARDING IN AN INFORMATION HANDLING SYSTEM WITH LOOPBACK CONFIGURATION

(71) Applicant: DELL PRODUCTS L.P., Round Rock, TX (US)

(72) Inventors: Anoop Ghanwani, Roseville, CA (US); Raja Sathianarayan Jayakumar, Fremont, CA (US); Per Henrik Fremrot, Novato, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 685 days.

(21) Appl. No.: 18/085,557

(22) Filed: Dec. 20, 2022

(65) Prior Publication Data

US 2024/0205172 A1 Jun. 20, 2024

(51) Int. Cl.

| | |
|---|---|
| ***H04L 12/56*** | (2006.01) |
| ***G06F 15/18*** | (2006.01) |
| ***G11C 7/10*** | (2006.01) |
| ***H04J 14/00*** | (2006.01) |
| ***H04L 29/08*** | (2006.01) |
| ***H04L 49/90*** | (2022.01) |

(52) U.S. Cl.

CPC .................................... *H04L 49/90* (2013.01)

(58) Field of Classification Search

CPC . H04L 49/90; H04L 49/1546; H04L 12/4625; H04L 12/4633; H04L 12/4641; H04L 49/3027; H04L 47/2441; H04L 69/324; H04L 45/38; H04L 41/0806; H04L 67/1001; H04L 67/61; H04L 69/22; H04L 67/10; G06N 20/00; G06N 3/063; G06N 3/084; H04J 14/0246; H04J 14/0227; H04J 14/0256; H04J 14/0283; H04Q 11/0005; G11C 7/1072; G11C 29/022; G11C 29/028

USPC .......................................................... 370/413

See application file for complete search history.

(56) References Cited

U.S. PATENT DOCUMENTS

| | | | | |
|---|---|---|---|---|
| 8,031,424 | B2 * | 10/2011 | Sutardja ................. | G11B 27/36 360/51 |
| 8,279,871 | B1 * | 10/2012 | Sivan .................. | H04L 12/4625 370/392 |
| 11,106,517 | B2 * | 8/2021 | Zhao ................... | G06F 11/0712 |
| 11,328,222 | B1 * | 5/2022 | Matthews ............... | H04L 47/32 |
| 2003/0048275 | A1 * | 3/2003 | Ciolac ...................... | G09G 5/14 345/501 |
| 2008/0247380 | A1 * | 10/2008 | LaVigne ............... | H04L 63/101 370/351 |

(Continued)

*Primary Examiner* — Edan Orgad
*Assistant Examiner* — Vanneilian Lalchinthang
(74) *Attorney, Agent, or Firm* — BAUGH LAW, LLC

(57) ABSTRACT

Presented herein are systems and methods for packet processing in an information handling system that uses loopback processing. In one or more embodiments, buffer accounting is done with respect to the original ingress port for packets when using loopback processing. Such embodiments have several benefits, including but not limited to, mitigating or eliminating head-of-line (HoL) blocking of traffic and headroom (plus additional buffers which may need to be allocated for use before priority-based flow control is generated) provisioning for the loopback port. Embodiments may include additional features, such as handling anomalies (e.g., corruption) and reclaiming reserved buffers if corruption or delays occur.

20 Claims, 9 Drawing Sheets

100

INFORMATION HANDLING SYSTEM 105

P1 Tx Rx
P2 Tx Rx 110
P3 Tx Rx
P4 Tx Rx 115
P5 Tx Rx
P6 Tx Rx 120

(56) References Cited

U.S. PATENT DOCUMENTS

2011/0255540 A1* 10/2011 Mizrahi .................. H04L 45/66
370/392
2015/0213849 A1* 7/2015 Srinivas ............... G11C 29/028
711/105
2017/0195259 A1* 7/2017 Florea ................... H04L 47/726
2021/0117360 A1* 4/2021 Kutch ................... G06F 3/0656
2021/0149707 A1* 5/2021 Thyagaturu ............. G06F 9/544
2021/0294496 A1* 9/2021 Kotzur .................. G06F 3/0656
2022/0303364 A1* 9/2022 Nandakumaran ... H04L 12/4633

* cited by examiner

800

900

PACKET FORWARDING IN AN INFORMATION HANDLING SYSTEM WITH LOOPBACK CONFIGURATION

BACKGROUND

A. Technical Field

The present disclosure relates generally to information handling systems. More particularly, the present disclosure relates to improved data processing in information handling systems with loopback configuration.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as switches, typically use ASICs (Application Specific Integrated Circuits) that are commonly referred to as network processing units (NPUs) to implement packet processing functions. These NPUs typically contain a packet processing pipeline that is designed around a fixed number of programmable stages or lookups. If the functionality needed to fully process a packet exceeds what can be implemented given those number of stages, a common solution involves the use of "loopback," which allows recirculation of the packet through the NPU of the information handling system. Recirculation allows the packet to be processed by the same stages again. Loopback is a technique that is applicable for both programmable and fixed-pipeline NPUs.

However, using loopback creates at least two issues. First, to enable loopback, at least one of the ports in the information handling system must be placed in loopback mode. This involves having the port configured such that a packet transmitted to that port (i.e., egress port) is received by that same port (i.e., ingress port). In other words, the transmit path of that port is connected to the receive path of that same port. Thus, there are fewer ports to receive external data traffic, which reduces the overall front panel (i.e., ports) bandwidth of the information handling system.

Second, the looped-back packet creates issues for buffer accounting. One such issue is referred to as internal head-of-line (HoL) blocking. HoL blocking happens as follows. First, an egress port becomes congested and a queue begins to build at that port. When that happens, a signal may be sent upstream to the one or more ingress ports that are sending traffic to that queue at that egress port to pause receiving data traffic to allow the egress port time to alleviate its backlog. Thus, congestion at that egress port may result in a signal being sent to an ingress port of the information handling system to slow or pause incoming data processing even though other egress ports that might receive data from that ingress port are not congested, to allow the egress port time to reduce its congested queue. Therefore, HOL blocking can significantly hamper performance of an information handling system. Typically such HoL blocking is observed in the network for pause frames between switches. But when using loopback within a switch, such HoL blocking can occur within the switch, which may be referred to as internal HoL blocking.

Accordingly, it is highly desirable to find new, more efficient ways for packet forwarding in an information handling system that supports loopback processing.

BRIEF DESCRIPTION OF THE DRA WINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 1 ("FIG. 1") graphically illustrates an information handling system that is enabled or configured with loopback functionality, according to embodiments of the present disclosure.

FIG. 2 graphically illustrates an "unfolded" view of an example 6-port switch information handling system, according to embodiments of the present disclosure.

DETAILED DESCRIPTION OF EMBODIMENTS

Figure 1:
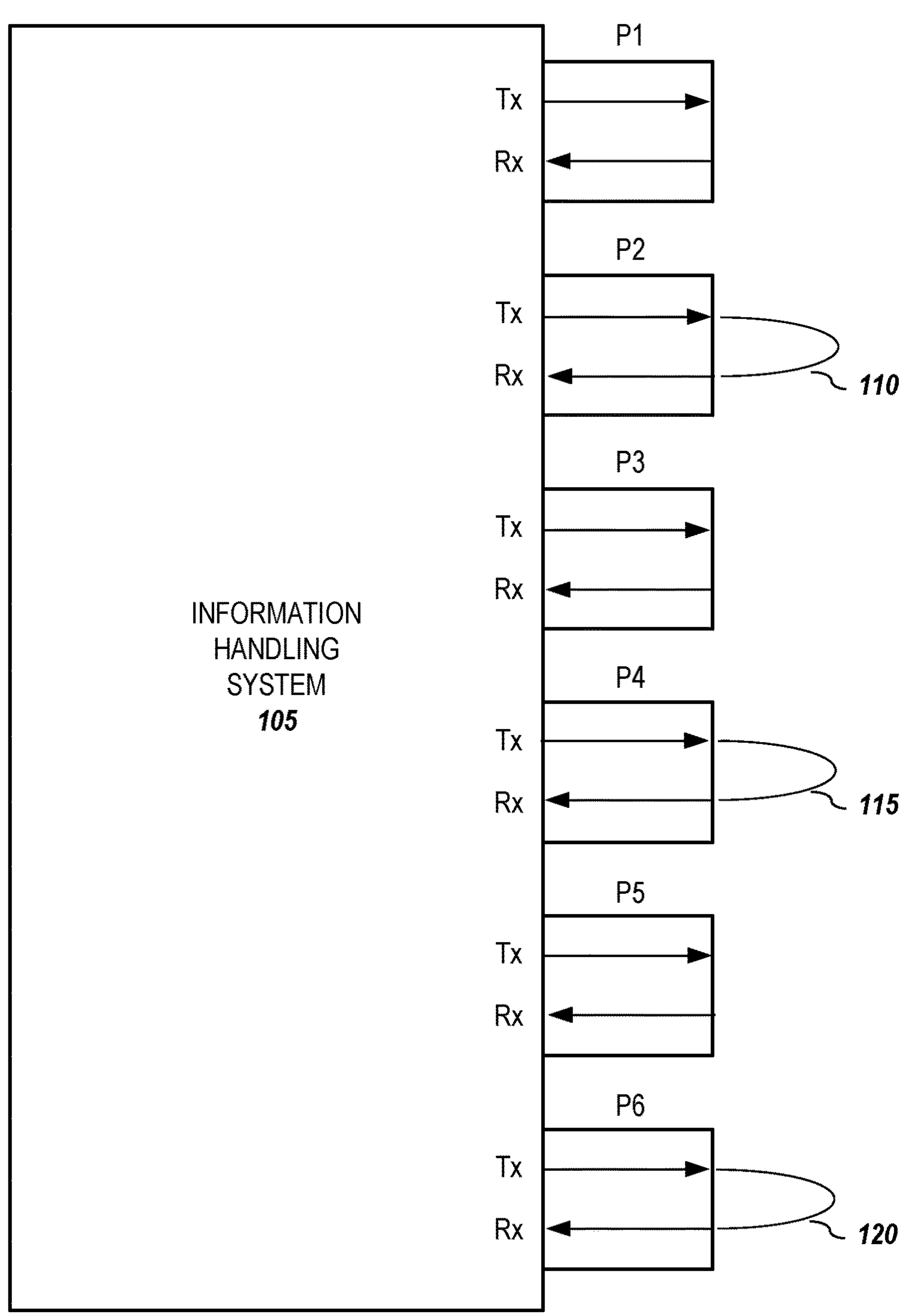

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall also be noted that although embodiments described herein may be within the context of packets and switching, aspects of the present disclosure are not so limited. Accordingly, the aspects of the present disclosure may be applied or adapted for use in other contexts. It should be noted that even though embodiments discussed below are discussed by way of illustration, for lossless traffic, the same or similar techniques may be used for lossy traffic.

A. GENERAL OVERVIEW

FIG. 1 graphically illustrates an information handling system that is enabled or configured to support loopback functionality, according to embodiments of the present disclosure. As illustrated, the information handling system 105 comprises a number of ports (e.g., P1-P6). One or more ports of the switch may be placed in a loopback mode. Such as port, operating in loopback mode, may then be referred to as a loopback port. In the depicted example of FIG. 1, two ports are configured to operate as loopback ports. Specifically, port 2 (110), port 4 (115), and port 6 (120) are configured in a loopback mode, in which the transmit path of the port connects to the receive path of the same port of the same information handling system 105. It should be noted that a loopback configuration may be configured to have the transmit path of the port physically connected to the receive path of that same port, or it may be done programmatically (i.e., configured internally within the information handling system 105).

For loopback processing, packets entering the information handling system for the first time from an external port (i.e., non-loopback port) will be processed and then forwarded to a loopback port. The first time the information handling system processes a packet received from an external port may be referred to as "first pass" processing. Processing is typically handled by a network processing unit (NPU), which implements stages in a pipeline, of the information handling system. Packets entering from the loopback port will go through the stages in the pipeline for added processing as part of a loopback pass. For example, an encapsulated packet arrives at the NPU, layer 2 (L2) and/or layer 3 (L3) lookups are performed, and the packet is decapsulated. The decapsulated packet is forwarded to a loopback port, and the decapsulated packets re-enters the NPU via the loopback port for subsequent processing (which may be referred to as "loopback pass" processing), in which L2/L3 lookups are done on the inner header. Note that it is possible to have the packet loopback more than once. Also, to ensure no oversubscription of bandwidth at the loopback port, often one loopback port is dedicated for each port that can receive external traffic.

Figure 2:
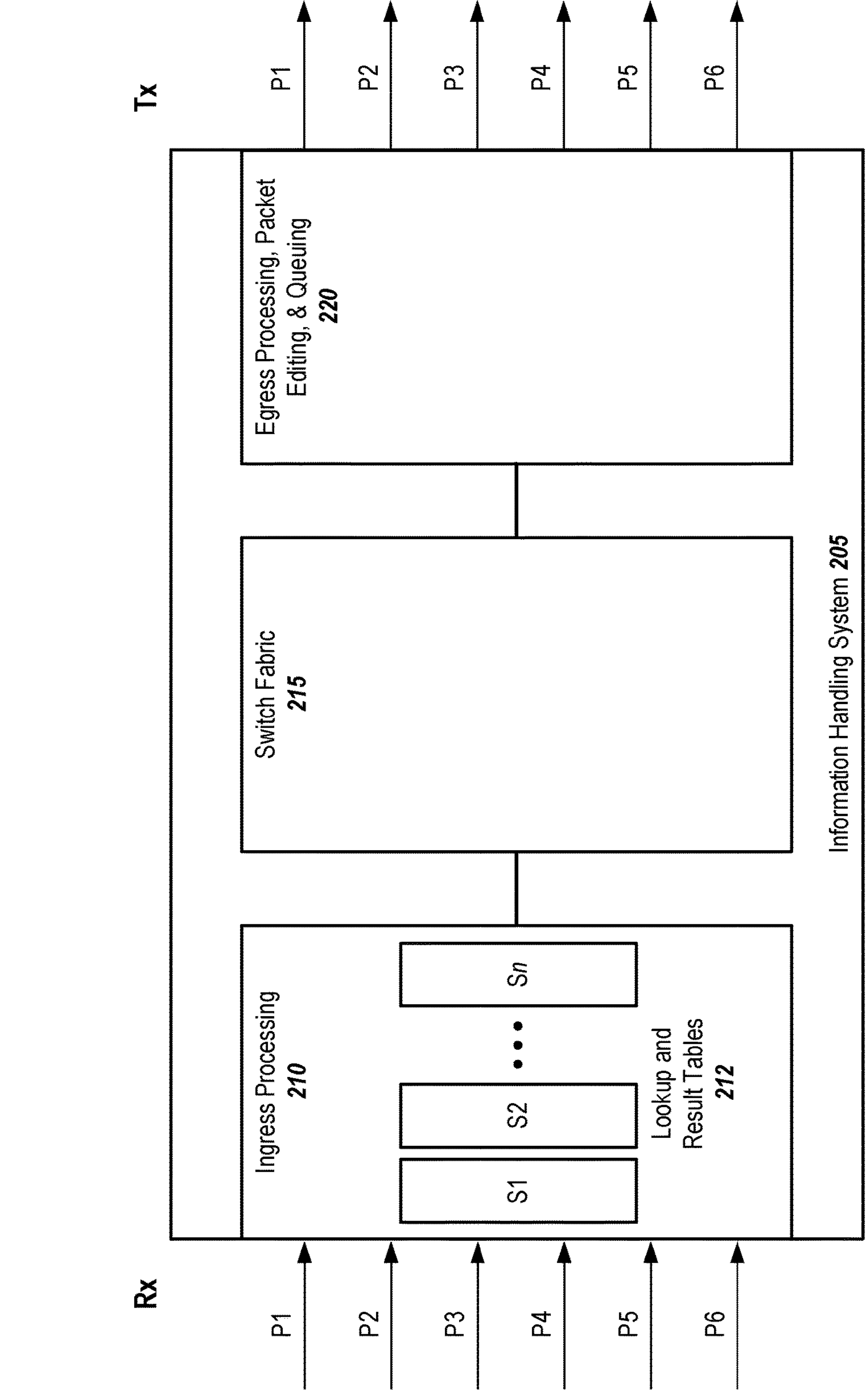

FIG. 2 graphically depicts an "unfolded" view of an example 6-port switch information handling system, according to embodiments of the present disclosure. The example 6-port switch 205 comprises an NPU that is functionally divided into an ingress stage or processing 210, switch fabric 215, and an egress stage or processing 220. The ingress pipeline 210 comprises one or more lookup tables and result tables 212, which are depicted as stages S1 through Sn in FIG. 2. Typically, there is a fixed number of programmable stages or lookups in the pipeline, and if the functionality needed to fully process the packet exceeds what can be implemented with those number of stages, then one method of providing additional processing is the use of loopback. Thus, use of loopback allows a packet to go through more stages than are possible in a single pass. Note that a stage may have a function or table lookup it performs on a first pass but may have the same or different function(s) or table lookup(s) for a loopback pass (or passes).

The packet buffer memory is typically organized into a number of fixed size buffer units, e.g., a 100 MB packet buffer may be organized into (1024×1024) 100-byte buffer units. The packets are placed in buffer memory comprising one or more of those buffer units (depending upon the size of the packet) during processing. If the packet and any associated metadata is larger than the memory size of one buffer unit, the packet may be stored in multiple buffer units, in which there is a first buffer unit and that buffer unit links to the next buffer unit, which links to the next buffer unit (if needed), and so on until the packet is fully stored in buffer memory. This format may be considered to be a buffer unit chain comprising a first buffer unit and a list of buffer units (i.e., the linking that indicates the next buffer unit in sequence of buffer units, which taken together store the packet). Typically, a shared buffer is used in which all parts of the NPU pipeline can access the packet in the shared buffer. An identifier (e.g., a pointer) to the first buffer unit that stores the packet may be used to represent the packet as it is processed (e.g., a pointer to the first buffer unit storing the packet is placed in a queue for transmission). Note, however, that other memory designs may also be employed.

Packets are sent to an egress port after ingress processing, where they may be queued behind other packets if the egress port is congested, and packets may be edited, which may be done before queueing or after dequeuing for transmission.

As noted above, one of the problems with an information handling system that is configured to enable loopback processing, such as the ones depicted in FIG. 1 and FIG. 2, is that the looped-back packet can create issues for buffer accounting. Buffer accounting for a packet is typically done using the packet's ingress port (commonly referred to as ingress accounting) and egress port (commonly referred to as egress accounting). In loopback mode, this means a packet will be accounted for in the buffer using two different sets of ports during each pass through the NPU. For the first pass, the accounting would be based on the original ingress port (for ingress accounting) and the loopback port (for egress accounting). For the second pass (or loopback pass), the accounting would be based on the loopback port (for ingress accounting) and the final egress port (for egress accounting). Note that multiple packet copies can result for multicast packets, and packet replication would typically be done in the final loopback pass (i.e., the second or subsequent pass).

Performing accounting in such a manner causes problems. For lossless traffic, performing buffer accounting in this manner during loopback processing can cause HoL blocking within the NPU. And, for lossy traffic, the egress port is not known on the first pass, so the packet must go through all the stages before knowing which queue to place it in and thus determine if it should be discarded. It is preferable that the packet be accounted for by its original ingress port (for ingress accounting) and its eventual egress port (for egress accounting) through the multiple passes. Embodiments herein are directed to resolving or mitigating the HOL blocking problem, particularly for lossless traffic. (Note that addressing this problem for lossy traffic may be considered less critical as it may, in certain situations, just delay a discard decision.)

Consider HoL blocking for lossless traffic when using loopback processing in an information handling system (e.g., a switch). Lossless traffic is typically identified by packet fields defined in standards, such as IEEE 802.1p COS (Class of Service) or IP DSCP (Differentiated Services Code Point). Logically, the use of loopback introduces an additional hop within the same switch. If one assumes a 1:1 mapping of ingress port-to-loopback, there should be no congestion during the first pass as the packet would be forwarded to the loopback for a loopback (i.e., second) pass through the NPU (ignoring the impact of the addition of packet metadata, which is additional data that the NPU may associate with that packet). If congestion on the egress port results, priority flow control (PFC) may be generated at the loopback ports that are sending traffic to, and causing congestion at, that egress port. Consider a queue at a loopback port that has been paused by receiving a PFC frame. Because it is paused, packets mapping to the priority that is paused at that loopback port will queued. Eventually, the loopback port gets congested, and this results in the generation of priority flow control (PFC) on the original ingress port. Pausing the loopback port would result in internal HoL blocking within the switch, where packets destined to an uncongested egress port would be paused (unnecessarily). Note that this result would not happen if loopback were not in use at the switch. In that case, congestion at the egress would have simply resulted in PFC generation at one or more ingress ports.

In addition to the HOL blocking issue mentioned above, there is also an issue of resource usage. Consider, for example, use of buffer memory. A switch typically has to dedicate buffer units for headroom (i.e., to store packets after PFC is generated) plus may use a few additional buffer units (i.e., to store traffic before the PFC was invoked) on loopback ports. These additional headroom buffer units are in addition to what is normally allocated for ports connected to user equipment, which significantly increases buffer units allocated to headroom in the switch. Having to allocate buffer memory to headroom may prevent a system with limited buffer units from supporting sufficient lossless classes.

Accordingly, what is needed are new, more efficient ways for packet forwarding in an information handling system that supports loopback processing. Presented in the next section are embodiments that eliminate or at least mitigate issues related to HOL blocking for systems that support loopback processing.

B. EMBODIMENTS FOR BUFFER ACCOUNTING TO ELIMINATE OR MITIGATE HEAD-OF-LINE BLOCKING

1. Associating Metadata Embodiments

Figure 3:
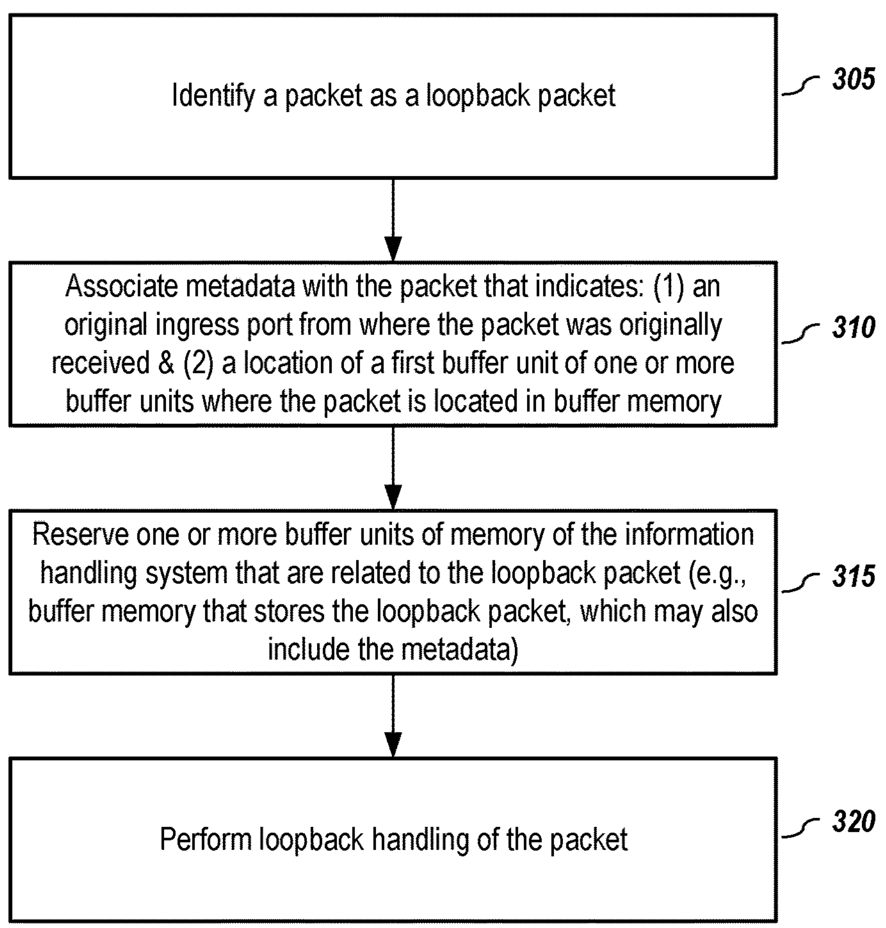
FIG. 3 depicts a methodology for handling a loopback packet, according to embodiments of the present disclosure.

FIG. 3 depicts a methodology for handling a loopback packet, according to embodiments of the present disclosure. During its processing, the information handling system identifies (305) that a packet is a loopback packet. In one or more embodiments, metadata is associated (310) with the packet that indicates: (1) an original ingress port from where the packet was originally received, and (2) an identifier (e.g., location or pointer) of at least a first buffer unit of one or more buffer units where the packet is stored in memory. The one or more buffer units of memory of the information handling system that relate to the loopback packet may be reserved (315). In one or more embodiments, the reserved memory includes the loopback packet and may also include its associated metadata. Depending upon the embodiment of loopback handling, the metadata (or a portion thereof) may be sent as part of the loopback handling process; thus, its memory may not need to be reserved. However, in one or more alternative embodiments, the metadata may be considered part of the packet and may be reserved.

It shall be noted that the order of the steps here, particularly Steps 310 and 315, may vary. For example, in one or more embodiments, an NPU, which is a non-transitory digital information handling component or set of components, of the information handling system may be configured to reserve a certain minimum number of bytes for packet metadata and store it at the very beginning of the packet (e.g., before the first byte of the packet) or at some predefined location (e.g., after the first n bytes). In such embodiments, the metadata fields may then be written to as the packet is processed, and read for editing purposes before egressing the packet. In one or more embodiments, the associated metadata may be stored separately from the packet. In one or more embodiments, the memory for the associated metadata may be configured to accept a dynamic size metadata (e.g., to allow for different factors such as types of data packets (e.g., unicast vs multicast packets)).

Figure 4:
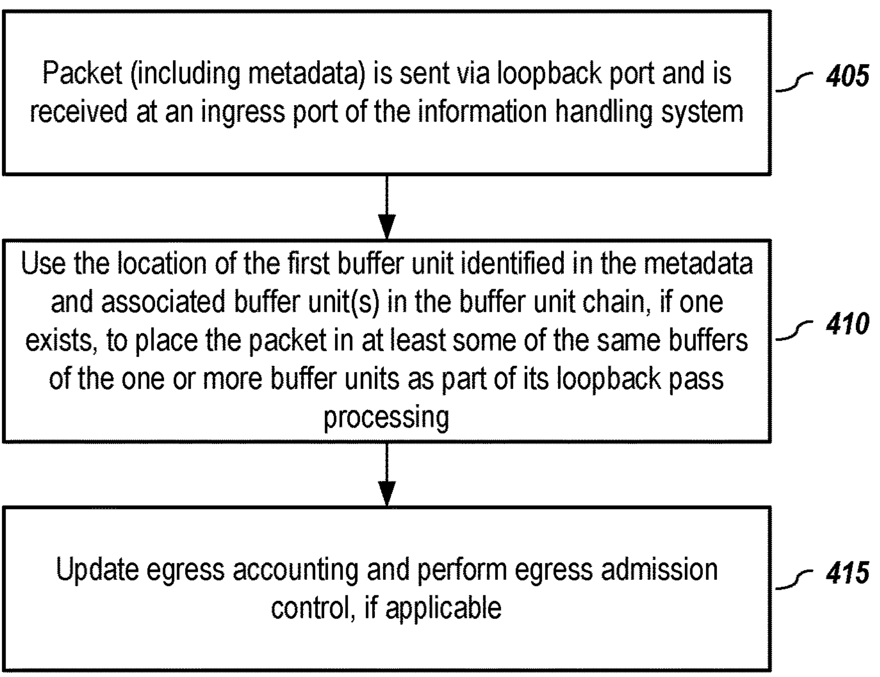
FIG. 4 depicts a methodology for loopback handling, according to embodiments of the present disclosure.
Figure 5:
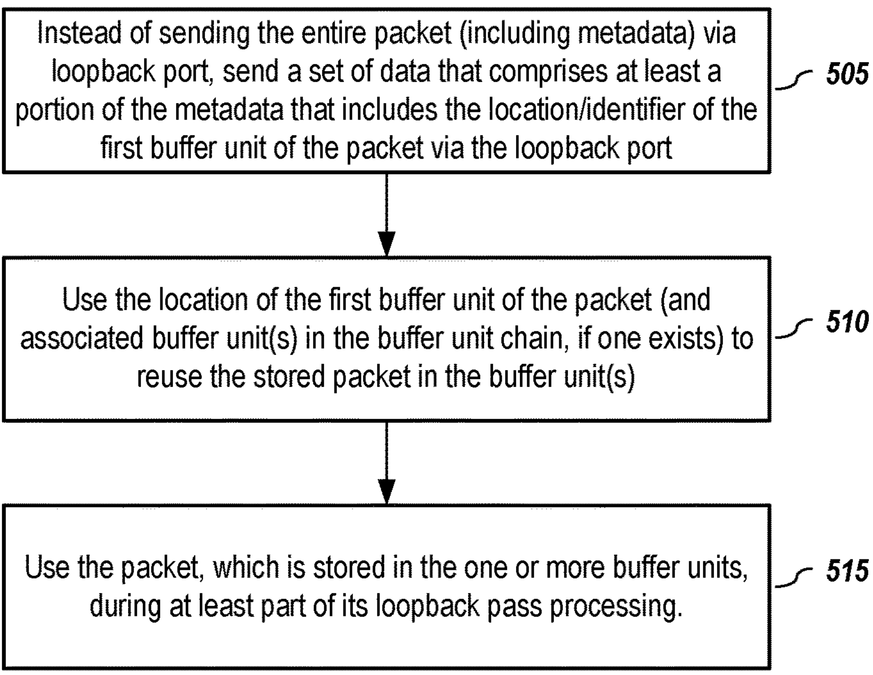
FIG. 5 depicts an alternative methodology for loopback handling, according to embodiments of the present disclosure.

In one or more embodiments, following reserving the memory related to the loopback packet and following associating metadata with the loopback packet, a loopback handling processing of the packet occurs (320). One skilled in the art shall recognize that there are different ways in which data related to the packet may be sent via loopback to effectuate the loopback handling, all of which methods shall be considered within the scope of the current document. FIGS. 4 and 5 depict examples of loopback handling, according to embodiments of the present disclosure.

2. Loopback Handling Embodiments

FIG. 4 depicts a methodology for loopback handling, according to embodiments of the present disclosure. In one or more embodiments, the packet, including its associated metadata, is sent (405) via loopback port of the information handling system and is received at an ingress port of the information handling system. Note that the sending of the packet may involve sending the packet via a loopback egress port that is physically connected to the same loopback ingress port of the same information handling system, or it may be done programmatically (i.e., configured internally within the information handling system without a visible external connector).

In one or more embodiments, the identifier (e.g., location) of the first buffer unit identified in the metadata (and associated buffer unit(s) in the buffer unit chain, if it exists for the packet (i.e., depending upon its size)) is used (410) to place the packet in at least some of those same buffer units of the one or more buffer units (which were allocated in the first pass when the packet was originally received from an external port (i.e., non-loopback port) and initially processed by the NPU) as part of its loopback pass (i.e., the packet's second or other subsequent pass through the information handling system) processing. It should be noted that all or some subset of the same buffers may be depending upon embodiment and/or depending upon whether some processing of the packet has affected its size (e.g., making it smaller due to packet editing, so it requires fewer buffers). Thus, in one or more embodiments, unless the packet or metadata was changed during egress processing, writing it again may not be necessary. Note that since the buffer unit chain was never released, ingress accounting continues to use the original ingress port.

In one or more embodiments, as part of the processing, egress accounting may be updated (e.g., decrement the counter(s) from the loopback as egress and increment the counter(s) for final egress port as the egress) and egress admission control (e.g., drop the packet if egress admission control determines the egress queue is over its limit) may be performed (415), if applicable.

FIG. 5 depicts an alternative methodology for loopback handling, according to embodiments of the present disclosure. In one or more embodiments, instead of sending the entire packet (including metadata) via loopback port, a set of data that comprises at least a portion of the metadata that includes the identifier (e.g., location) of the first buffer unit of the packet may be sent (505) via the loopback port. The location of the first buffer unit of the packet identified in the loop-backed portion of the metadata may be used (510) to re-use the already-stored packet that has been reserved in the buffer(s). For example, in one or more embodiments, instead of transmitting the entire packet during loopback, only the first b bytes of the packet that are significant (e.g., ones that indicate the first buffer unit's location and/or any other bytes that may have been changed in or added to the original packet), along with the metadata need only be transmitted since the rest of the packet will remain in the memory unchanged. Note that such embodiments help reduce compute resources usage and latency, and such embodiments may help reduce congestion if n:1 (n ingress ports map to the same loopback egress port) and n:m (n ingress ports map to m (<n)) loopback egress ports) use cases. Note that even for a 1:1 use case, such embodiments can reduce the probability of oversubscription due to addition of metadata.

Returning to FIG. 5, in one or more embodiments, the packet, which is stored at the one or more buffer units, may be used (515) during at least part of its loopback pass processing.

Note that FIGS. 4 and 5 represent embodiments of the loopback pass processing. However, it should be noted that additional alternations or embodiments may be made to either or both methodologies. For example, either or both of the embodiments in FIG. 4 and FIG. 5, a mechanism may exist to handle anomalies, such as packet corruption.

In one or more embodiments, if the packet is corrupted while being sent over the loopback port or other anomalous incidents, the information handling system may be configured with a mechanism or methodology to handle such events.

Figure 6:
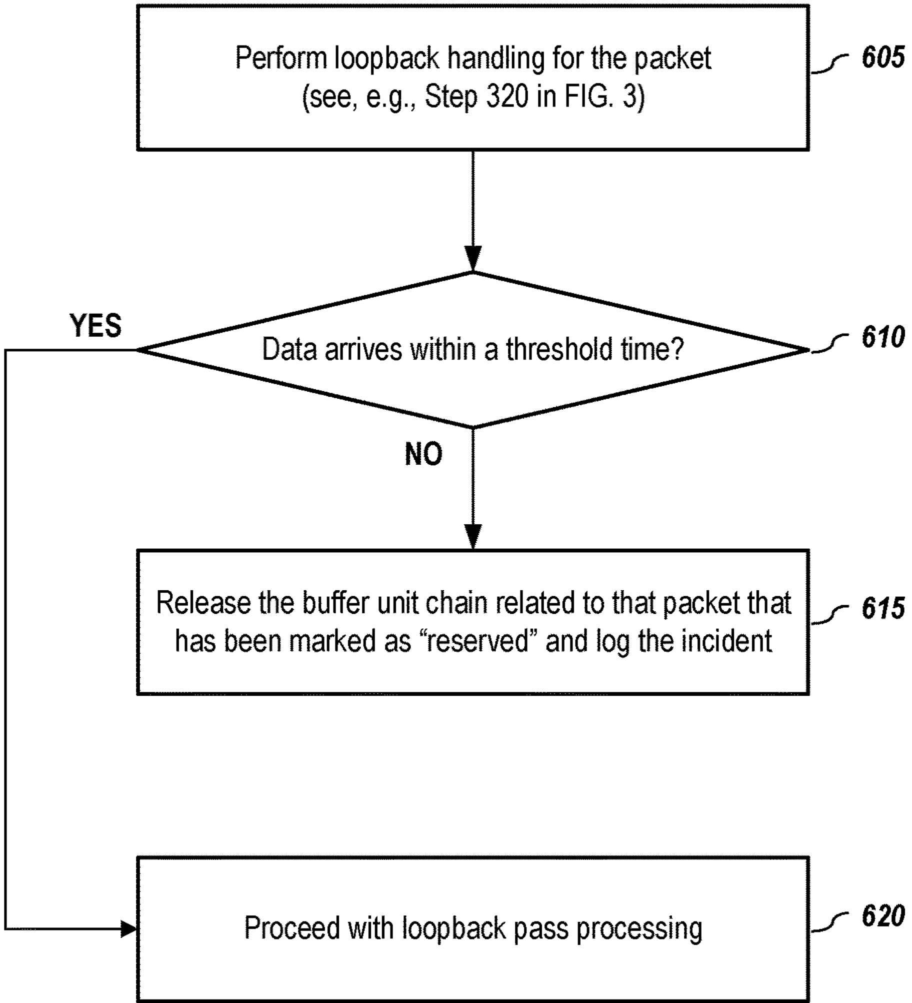
FIG. 6 depicts a methodology for releasing reserved memory, according to embodiments of the present disclosure.

Consider, by way of example, the scenario/methodology depicted in FIG. 6. Once loopback handling has been performed (605), if the data does not arrive (610) within a threshold time, the buffer unit chain related to that packet that has been marked as "reserved" may be released (615). In one or more embodiments, since the latency is likely to be known and very tightly bounded, the threshold time may be related to the latency (e.g., within an expected latency that may include the maximum queueing delay at the loopback port). Note that the "data" arriving in Step 610 may be the entire packet, a portion of the packet, the metadata, a portion of the metadata, or some combination of thereof depending upon the embodiment. If the data does not arrive within the threshold time, this incident for this packet may be logged for future evaluation and/or an alert may be sent to an administrator. But, if the packet arrives (610) within the expected threshold time, the packet may proceed (620) with its loopback pass processing. It shall be noted that the information handling system may be configured to release the reserved buffer(s) under other conditions or in other circumstances.

Figure 7:
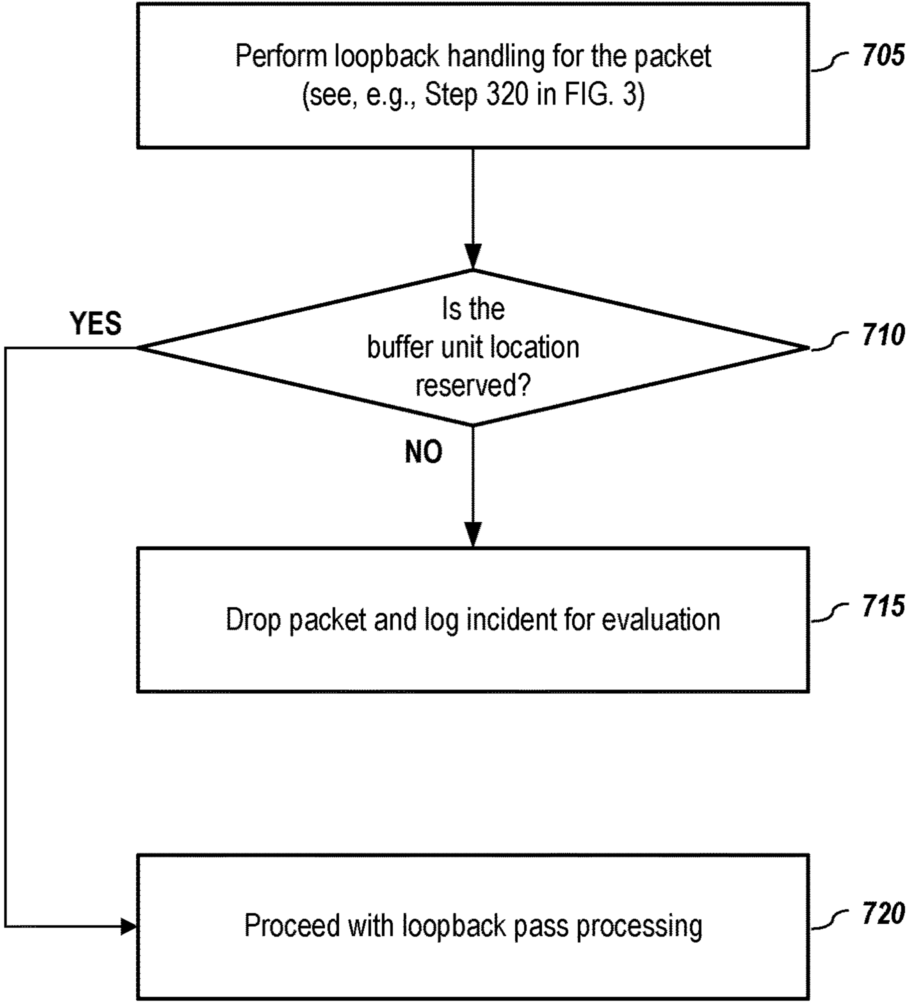
FIG. 7 depicts a methodology for handling anomalies, according to embodiments of the present disclosure

Also consider, by way of example, the scenario/methodology depicted in FIG. 7. Once loopback handling has been performed (705), if a packet arrives for its loopback pass with metadata indicating its buffer unit chain is at a location that is not reserved (710), the packet may be dropped (715). It should be noted that this issue should not happen under normal operation; accordingly, this error may be logged (715) for future evaluation and/or an alert may be sent to an administrator. Of course, as illustrated in FIG. 7, if the packet arrives for its loopback pass and there is no issue with reservation of the buffer memory for the packet, the packet may proceed with its processing (720).

Concerning edits to the packet, in one or more embodiments, edits of the packet are held until the packet is to be transmitted on its final egress port. One reason for reserving edits to the packet until its final loopback pass is because if the packet grows after editing, it may not fit in the reserved buffers that the original packet vacated. However, alternatively, to compensate for changes in packet size, a packet may have a set of one or more additional buffer units associated with them that would allow the packet to grow by a maximum possible size after n loopback operations or passes, n being a configurable value depending on the number of loopback passes needed for a given deployment. In one or more embodiments, packet shrinkage after editing may not impact the release of buffer units associated with the packet since all the units associated with the packet would typically be organized as a buffer unit chain as described previously. In one or more embodiments, the information handling system may be configured to release buffers if the packet shrinks after editing. In one or more embodiments, the number of buffer unit to be released may be known by carrying the information about the original packet size in the metadata (e.g., in a shim header) so that buffer units may be released when the packet is sent on the egress port.

In one or more embodiments, sizing issues may also be managed by appropriately sizing the metadata for the number of times the packet would be looped back. More than one loopback (i.e., two passes in total) is not expected to be common. Thus, using the metadata, the second pass may have knowledge of edits that would have been applied during the first pass.

One skilled in the art shall recognize a number of benefits provided by one or more of the embodiments described herein. For example, by doing the accounting according to embodiments herein, a packet is ensured to be accounted for with reference to its original ingress port into the switch. Embodiments also ensure there is always space for packets arriving from the loopback port as long as it was admitted at the ingress port. Note that, in embodiments, any priority-based flow control (PFC) generation may be done directly on that ingress port thereby eliminating internal HoL blocking. Note also that, in embodiments, the loopback port or any of its queues, should never be paused since the ingress accounting would not associate any packets with it; instead, the packets are always associated with the packet's original ingress port. Finally, in one or more embodiments, the information handling system does not need to reserve headroom or additional MTUs (maximum transmission units) for the loopback ports.

One skilled in the art shall recognize that other optimizations or modifications may be incorporated into one or more embodiments, which falls within the scope of the current disclosure. For example, in the case of multiple loopbacks (i.e., multiple passes through the processing pipeline), n bits in a shim header may be used to indicate which iteration of loopback (i.e., which loopback pass) the packet is currently in. Note that using n bits allows for up to $2^n$ passes through the NPU of the information handling system. Using this methodology, the loopback port information would not need to be carried in the packet if 1:1 (ingress port to loopback egress port) mapping is used, since the appropriate loopback port for a given pass may be regenerated from the ingress port and loopback iteration number.

Embodiments herein are applicable at least to information handling systems with memory architectures where the buffer memory is shared across all ports or across the ingress and loopback ports. Such memory architectures are the most common architectures currently in use. If the information handling system has multiple memory modules with each ingress port mapped to one of the modules, then in one or more embodiments, both the ingress port and corresponding loopback port should be allocated such that they map to the same memory module If the memory architecture is such that it is implemented using multiple memory modules split across a set of (ingress, egress) port pairs and there is a possibility that the packet needs to change the memory modules as it goes through the loopback passes, additional overhead processing may be used to handling the memory change and updating of the metadata.

C. SYSTEM EMBODIMENTS

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 8:
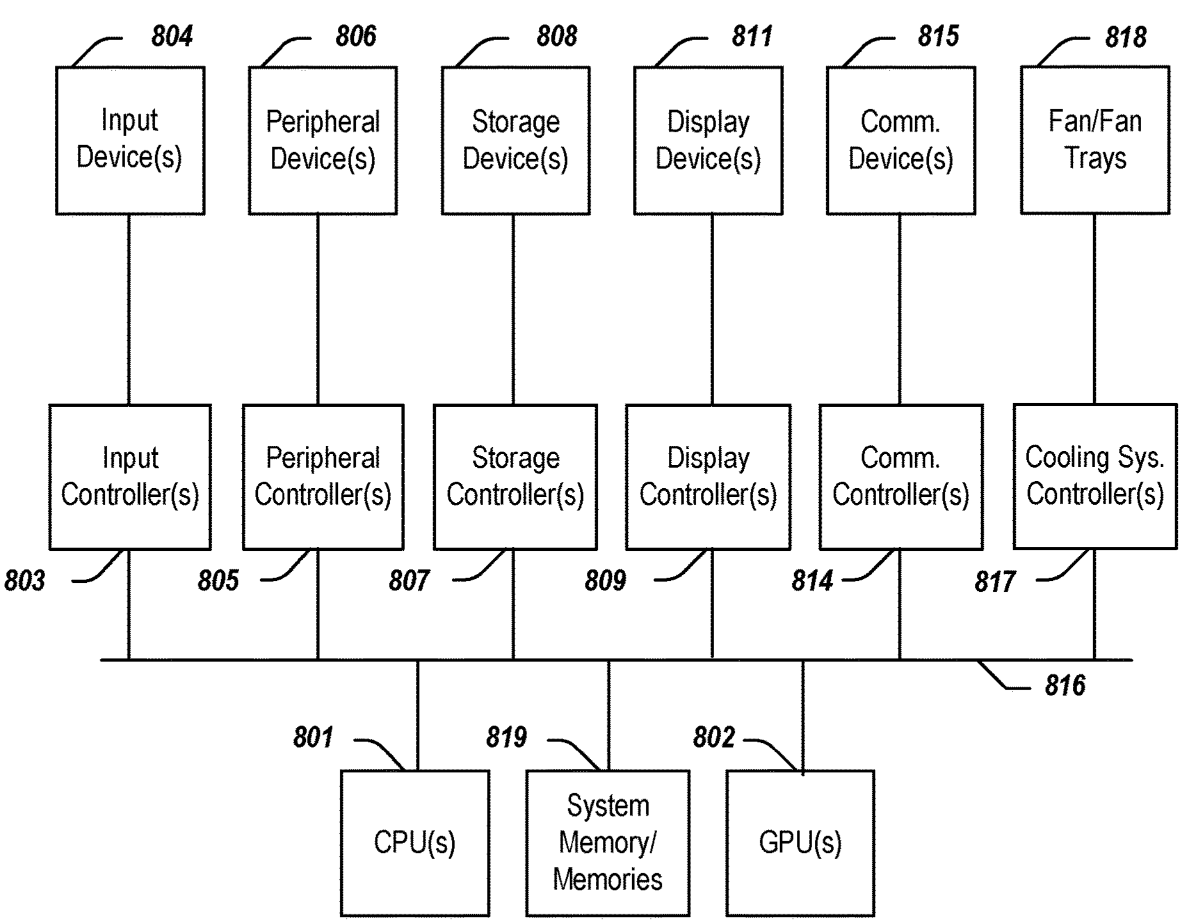
FIG. 8 depicts a simplified block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, stylus, microphone, camera, trackpad, display, etc. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 9:
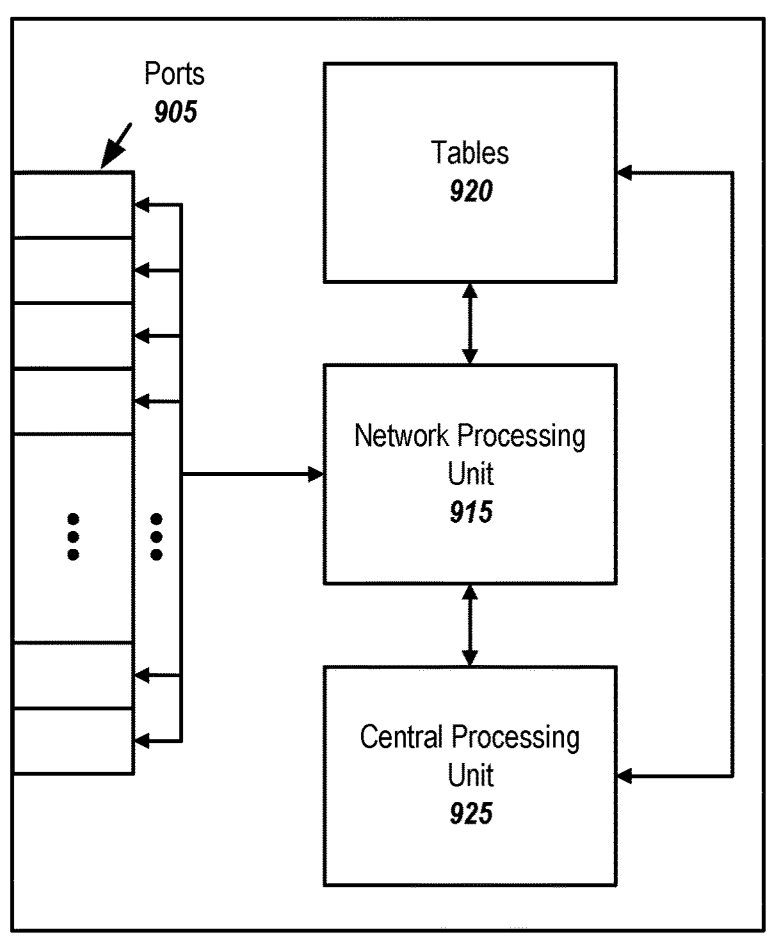
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure although it shall be understood that such system may be differently configured and include different components, additional components, or fewer components.

The information handling system 900 may include a plurality of I/O ports 905, a network processing unit (NPU) 915, one or more tables 920, and a CPU 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts.

Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A processor-implemented method comprising:
responsive to a packet being identified to be sent to a loopback port of an information handling system:
reserving one or more buffer units of memory of the information handling system for storing information related to the packet;
associating metadata with the packet that indicates:
an original ingress port from where the packet was originally received at the information handling system; and
an identifier of a first buffer unit of the one or more buffer units where the packet is stored in memory of the information handling system; and
sending data related to the packet via the loopback port to effectuate loopback handling of the packet at the information handling system.

2. The processor-implemented method of claim 1:
wherein the step of sending data related to the packet via the loopback port to effectuate loopback handling of the packet at the information handling system comprises sending at least the identifier of the first buffer unit of the one or more buffer units where the packet is stored in memory and the packet, as part of the data related to the packet; and
wherein the processor-implemented method further comprises:
using the identifier of the first buffer unit and a corresponding linking that forms a buffer unit chain, if one exists, to place the packet in at least some of the same buffer units of the one or more buffer units as part of its loopback pass processing.

3. The processor-implemented method of claim 1 further comprising:
as part of processing the packet during its loopback pass:
updating egress accounting for the packet; and
performing egress admission control, if any.

4. The processor-implemented method of claim 1:
wherein the step of sending data related to the packet via the loopback port to effectuate loopback handling of the packet at the information handling system comprises sending at least the identifier of the first buffer unit of the one or more buffer units where the packet is stored in memory, as part of the data related to the packet; and
wherein the processor-implemented method further comprises:
not sending at least some or all of the packet via the loopback port; and
reclaiming at least a portion of the packet stored in the one or more buffer units, which were reserved to preserve the packet for use during at least part of its loopback pass processing.

5. The processor-implemented method of claim 1 further comprising:
responsive to a loopback threshold time having expired in which the data related to the packet was sent to the loopback port as part of the loopback handling but was not received within the loopback threshold time, releasing from being reserved the one or more buffer units related to the packet.

6. The processor-implemented method of claim 1 further comprising:
responsive to the one or more buffer units related to the packet that was sent via the loopback port not being reserved, dropping the packet.

7. The processor-implemented method of claim 1 further comprising:
reserving edits to the packet that would cause it to grow until egress processing during a final pass when the packet is to be transmitted from the information handling system via a final egress port.

8. The processor-implemented method of claim 1 wherein the step of reserving the one or more buffer units of memory of the information handling system that are associated with storing information related to the packet comprises:
reserving the one or more buffer units for the packet; and
reserving a set of one or more additional buffer units to account for edits to the packet that increase its size.

9. The processor-implemented method of claim 1 wherein the metadata further comprises a loopback iteration indicator that indicates a current loopback iteration number for the packet.

10. An information handling system comprising:
one or more processors;
a set of ports in which at least one of the ports is configured as a loopback port; and
a non-transitory computer-readable medium or media comprising one or more sets of instructions which, when executed by at least one of the one or more processors, cause steps to be performed comprising:
responsive to a packet being identified to be sent to a loopback port of the information handling system:
reserving one or more buffer units of memory of the information handling system for storing information related to the packet;

associating metadata with the packet that indicates:

an original ingress port from where the packet was originally received at the information handling system; and an identifier of a first buffer unit of the one or more buffer units where the packet is stored in memory of the information handling system; and sending data related to the packet via the loopback port to effectuate loopback handling of the packet at the information handling system.

11. The information handling system of claim 10:

wherein the step of sending data related to the packet via the loopback port to effectuate loopback handling of the packet at the information handling system comprises sending at least the identifier of the first buffer unit of the one or more buffer units where the packet is stored in memory and the packet, as part of the data related to the packet; and wherein the non-transitory computer-readable medium or media further comprises one or more sets of instructions which, when executed by at least one of the one or more processors, cause steps to be performed comprising:

using the identifier of the first buffer unit and a corresponding linking that forms a buffer unit chain, if one exists, to place the packet in at least some of the same buffer units of the one or more buffer units as part of its loopback pass processing.

12. The information handling system of claim 10 wherein the non-transitory computer-readable medium or media further comprises one or more sets of instructions which, when executed by at least one of the one or more processors, cause steps to be performed comprising:

as part of processing the packet during its loopback pass:

updating egress accounting for the packet; and performing egress admission control, if any.

13. The information handling system of claim 10:

wherein the step of sending data related to the packet via the loopback port to effectuate loopback handling of the packet at the information handling system comprises sending at least the identifier of the first buffer unit of the one or more buffer units where the packet is stored in memory, as part of the data related to the packet; and wherein the non-transitory computer-readable medium or media further comprises one or more sets of instructions which, when executed by at least one of the one or more processors, cause steps to be performed comprising:

not sending at least some or all of the packet via the loopback port; and reusing, for use during at least part of its loopback pass processing, at least some of the one or more buffer units that already store the packet to eliminate having to re-write the packet into memory for the loopback pass processing.

14. The information handling system of claim 10 wherein the non-transitory computer-readable medium or media further comprises one or more sets of instructions which, when executed by at least one of the one or more processors, cause steps to be performed comprising:

responsive to a loopback threshold time having expired in which the data related to the packet was sent to the loopback port as part of the loopback handling but was not received within the loopback threshold time, releasing from being reserved the one or more buffer units related to the packet.

15. The information handling system of claim 10 wherein the non-transitory computer-readable medium or media further comprises one or more sets of instructions which, when executed by at least one of the one or more processors, cause steps to be performed comprising:

responsive to the one or more buffer units identified using the data related to the packet that was sent via the loopback port not being reserved, dropping the packet.

16. A non-transitory digital information handling component or components of an information handling system configured to perform steps comprising:

responsive to a packet being identified to be sent to a loopback port of the information handling system:

reserving one or more buffer units of memory of the information handling system for storing information related to the packet;

associating metadata with the packet that indicates:

an original ingress port from where the packet was originally received at the information handling system; and an identifier of a first buffer unit of the one or more buffer units where the packet is stored in memory of the information handling system; and sending data related to the packet via the loopback port to effectuate loopback handling of the packet at the information handling system.

17. The non-transitory digital information handling component or components of the information handling system of claim 16:

wherein the step of sending data related to the packet via a loopback port to effectuate loopback handling of the packet at the information handling system comprises sending at least the identifier of the first buffer unit of the one or more buffer units where the packet is stored in memory and the packet, as part of the data related to the packet; and wherein the non-transitory digital information handling component or components of the information handling system are further configured to cause steps to be performed comprising:

using the identifier of the first buffer unit and a corresponding linking that forms a buffer unit chain, if one exists, to place the packet in at least some of the same buffer units of the one or more buffer units as part of its loopback pass processing.

18. The non-transitory digital information handling component or components of the information handling system of claim 16:

wherein the step of sending data related to the packet via a loopback port to effectuate loopback handling of the packet at the information handling system comprises sending at least the identifier of the first buffer unit of the one or more buffer units where the packet is stored in memory, as part of the data related to the packet; and wherein the non-transitory digital information handling component or components of the information handling system are further configured to cause steps to be performed comprising:

not sending at least some or all of the packet via the loopback port; and reusing, for use during at least part of its loopback pass processing, at least some of the one or more buffer units that already store the packet to eliminate having to re-write the packet into memory for the loopback pass processing.

19. The non-transitory digital information handling component or components of the information handling system of claim 16 wherein the non-transitory digital information handling component or components of the information handling system are further configured to cause steps to be performed comprising:

responsive to a loopback threshold time having expired in which the data related to the packet was sent to the loopback port as part of the loopback handling but was not received within the loopback threshold time, releasing from being reserved the one or more buffer units related to the packet.

20. The non-transitory digital information handling component or components of the information handling system of claim 16 wherein the step of reserving the one or more buffer units of memory of the information handling system that are associated with storing information related to the packet comprises:

reserving the one or more buffer units for the packet; and reserving a set of one or more additional buffer units to account for edits to the packet that increase its size.

* * * * *